Patented Aug. 13, 1946

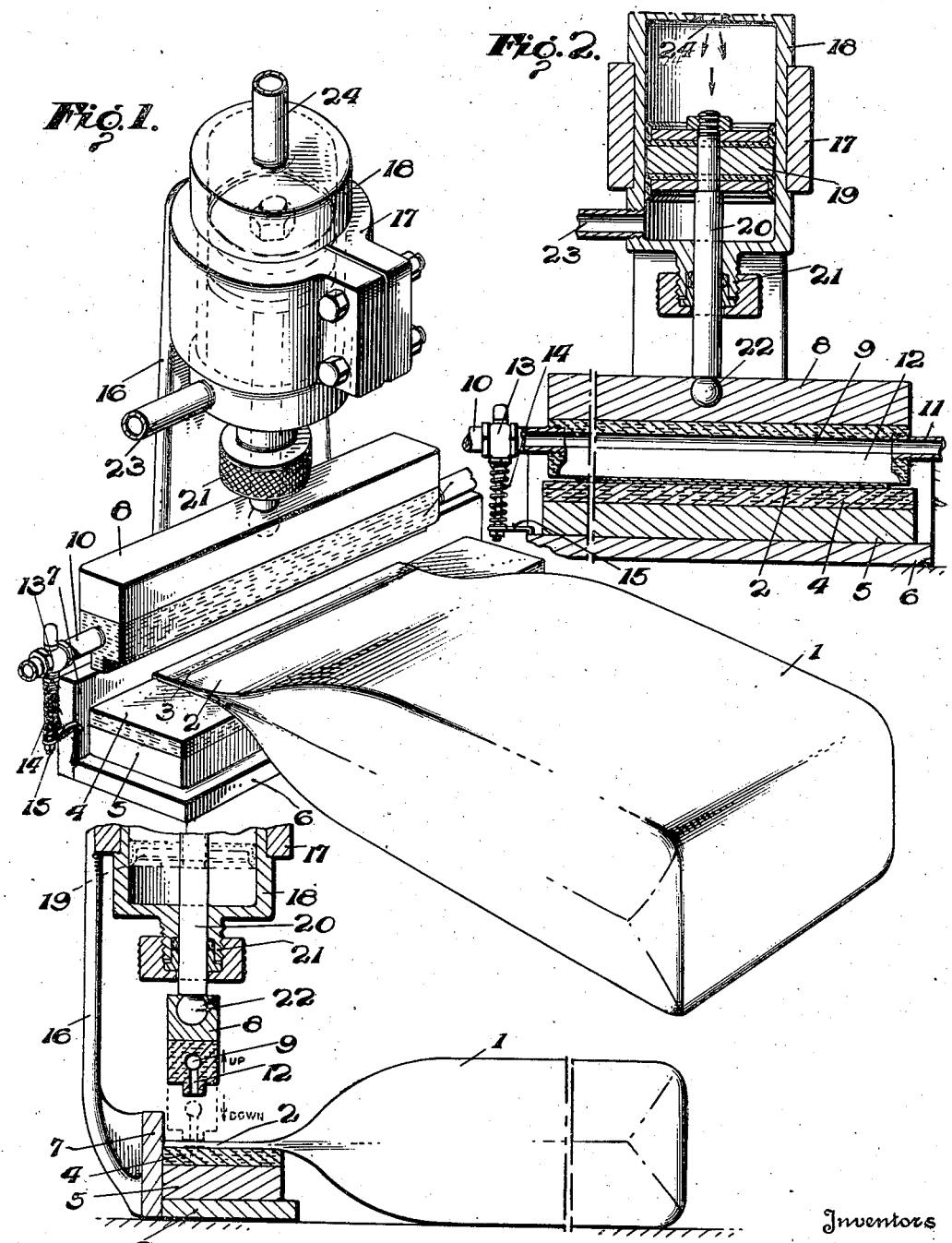

2,405,675

UNITED STATES PATENT OFFICE 2,405,675

METHOD OF FORMING SEALS

Charles A. Southwick, Jr., South Norwalk, Conn., and Arthur F. Stagmeier, Upper Montclair, N. J., assignors to General Foods Corporation, New York, N. Y., a corporation of Delaware Application July 25, 1940, Serial No. 347,542

8 Claims. (Cl. 154—42)

This invention relates to the formation of heat-sealed seams or joints between sheets or layers of wrapping or packaging material.

In packaging various materials in bags, wrappers, carton liners and the like, it is often desirable in practice to provide tightly sealed packages. For example, it is desirable to package some materials under vacuum in substantially airtight packages; in other cases it is desirable to prevent the escape of moisture vapor or volatile constituents from a package, or to protect the contents of a package from the influence of the outside air or other medium to which the package may be subjected. The accomplishment of these results has been facilitated by the development of better packaging materials and also by the use of thermoplastic sealing materials which become plastic when heated and hence can be united integrally by the application of heat and pressure.

In practice such seals are usually effected by the use of heated presser bars or rollers between which the juxtaposed layers of packaging material are pressed together and heated, or by the use of a heated presser bar or roller in combination with a yielding backing member. Substantial difficulties have been encountered, however, in the use of this method of sealing. For instance it is difficult even with great care to maintain a uniform, true pressing surface without distortion, particularly where the seam to be made has substantial length, and as a consequence variations in pressure and temperature cause imperfect seals. Also the use of hot metallic sealing members in direct contact with certain materials such as Pliofilm involves difficulties due to the tendency of such materials to adhere to the sealing members, so that in practice it is customary to employ laminated sheet stock with resulting increased cost.

Further where there are irregularities in the material or where additional thicknesses of material are interposed between the sealing elements, the irregular surface of the packaging material may prevent the formation of a perfect seam. When bulk material is to be packaged, some of the loose material may find its way between the surfaces to be sealed with similar objectionable results. When packaging bulk materials under vacuum, for example, the package must be evacuated and thereafter sealed and the suction may cause the displacement of some of the material into the sealing zone. In order to minimize the above difficulties, the presser elements may be maintained in contact with the material for a substantial period. However, this precaution causes loss of time and increased cost and furthermore imperfect seals are still encountered which slow up production and, if undetected, cause deterioration of the product.

One of the objects of the present invention is to insure absolute uniformity of pressure throughout the entire sealing zone, regardless of variations in thickness of the material or the presence of foreign material in the seam, etc.

Another object is to facilitate the application of heat to the material in such a manner as to obtain rapid heating to the desired temperature and at the same time a uniform temperature throughout the sealing zone.

A further object is to facilitate the control of the temperature in the sealing zone.

Another object is to provide a method of sealing thermoplastic materials which does not require the use of heated metallic sealing members.

A still further object is to enable more rapid sealing with consequent savings in time and expense.

The invention is applicable generally to forming and sealing operations with various types of packages, as for example forming the side and end seams and closing and sealing the mouth of bags, wrappers, liners either in or to be inserted later in cartons, etc., and regardless of the particular material to be packaged. Further any suitable type of packaging material may be employed, the choice depending on the nature of the material to be packaged and the conditions to be maintained in the package. Thermoplastic sheet material or sheet material having a thermoplastic coating may be used, in which event the seal may be formed at any point where two layers of material come in contact, or coatings of thermoplastic sealing material may be formed on the base material only at points where seals or seams are to be formed. Examples of suitable sheet materials are rubber or rubber derivatives of the type known as Pliofilm, waxed paper, heat-sealing cellulosic materials such as heat-sealing Cellophane, etc.

It has been found that perfect seals of the types referred to above can be obtained rapidly and with practically complete uniformity by the application to the sealing zone of a hot fluid under pressure which presses the packaging material together and at the same time heats it to the desired temperature. Gaseous fluid media are preferred because of the ease with which they can be handled and controlled as pointed out hereinafter. Any suitable inert gas or condensable vapor can be employed with good results, air and steam being mentioned as examples because of their cheapness and ready availability. However, it is preferred in most instances to employ condensable vapors because their temperature can readily be controlled accurately and also because of their latent heat.

The gas or vapor, compressed and heated to the desired temperature, is applied to the material to be sealed in any suitable manner. In some cases the fluid pressure may be applied to opposite sides of the seam to be sealed, the pressure on the two sides being substantially equalized to prevent displacement of the packaging material. In other cases differential pressures may be desirable, or pressure on one side and vacuum on the other. It is preferred in most cases, however, to apply the fluid pressure to one side of the seam only, the packaging material being held against a suitable backing member.

Preferably the application of the fluid pressure is limited to the area to be sealed in order to provide a well-defined and properly located seam. For this purpose various forms of nozzles or similar apparatus can be employed to confine the area to be sealed and provide a confined path or chamber for the fluid medium. For example, the packaging material can be clamped together along the edges of the sealing zone by members forming a chamber extending over the area to be sealed on one or both sides of the material. Where a backing member is used, the packaging material may be clamped between it and a nozzle having a suitably shaped opening or slot in its face whereby the fluid medium comes in contact with the packaging material over a limited area which defines the shape and extent of the seam.

To prevent waste and loss of heat between sealing operations the supply of heated fluid is preferably turned on automatically or otherwise whenever a seal is to be made and turned off again as soon as the seal is completed. Automatic control may be provided in any suitable way, as by an automatically operated valve which is opened whenever a bag or other package to be sealed is placed in sealed position and is closed when the seal is completed.

Moreover, the fluid medium may, if desired, be circulated in a substantially closed path, and it will be understood that any suitable means may be used in conjunction with such a circuit for heating, compressing and controlling the temperature, pressure and rate of flow of the fluid, for trapping and eliminating any entrained air or water, etc.

The pressures and temperatures to be employed can be varied as desired, depending on the nature of the fluid medium, the nature of the sealing material, the speed of operation desired, and other conditions. For example, when steam is used to seal Pliofilm, a gauge pressure of 20 pounds equivalent to approximately 260° F. has been found to produce excellent seams within a period of about ten seconds. In case it is desired to speed up the operation higher pressures and temperatures can be employed, the time required to effect the seal decreasing as the temperature and pressure are increased. For example, steam pressures as high as 50 to 100 pounds or higher can be used with good results, good seams having been obtained in as little as one-fourth of a second with gauge pressure of 100 pounds.

The drawing illustrates somewhat diagrammatically a simple apparatus for practicing the method described above in the formation of seams or the closing and sealing of bags and similar containers and packages. As shown herein said apparatus is employed for sealing the mouths of individual bags such as evacuated bags of Pliofilm or the like for packaging coffee. It is to be expressly understood, however, that the invention is not limited to this use nor to any particular type of apparatus for practicing the same and that the drawing is not to be construed as a definition of the limits of the invention, reference being had to the appended claims for this purpose.

In the drawing,

Fig. 1 is a perspective view of the apparatus;

Fig. 2 is a vertical section through the apparatus; and

Fig. 3 is a vertical section through the apparatus taken at right angles to Fig. 2.

It will be understood that the bag 1 is first filled with the desired material and evacuated or otherwise treated preparatory to sealing its mouth 2 along the line 3 thereof, and that if desired the sealing means to be described may be suitably associated with apparatus for performing these operations. The mouth of the bag is then brought into position against a backing member comprising a flat face 4 which may be of any suitable material, preferably fiber, composition or other nonmetallic substance, and a support 5 which is carried by the frame plate 6. As shown the frame comprises also a vertical plate 7 against which the edge of the mouth of the bag may be brought to determine the location of the seam 3.

Opposed to the backing member is a nozzle member 8 which like the face plate 4 is preferably of suitable non-metallic material, said member having a passage 9 therein to which a hot fluid under pressure, such as steam, is admitted by pipe 10 and from which it may be discharged if desired by a pipe 11. In communication with the passage 9 is an elongated slot 12, the open side of which is of such size and shape as to contact the mouth 2 of the bag over the area which is to be sealed. In the present instance the slot 12 is straight and of greater length than the mouth of the bag in order to provide a straight narrow sealing zone extending entirely across said mouth. The steam supply is automatically controlled by a suitable valve 13 normally maintained closed by a spring 14 and having an operating arm 15 adapted to contact the supporting frame plate 6 to open the valve as the nozzle is brought into the sealing position shown in dotted lines in Fig. 3.

Any suitable means can be employed for moving the nozzle member 8 into sealing position. In the form shown, a frame upright 16 carries a split ring 17 within which is clamped a cylinder 18. The piston 19 operates a piston rod 20 passing through a suitable stuffing box 21 and carrying the nozzle member 8 at its outer end by means of a ball joint 22. Any suitable operating fluid can be admitted to the cylinder 18 by means of pipe 23 and exhausted therefrom through pipe 24, or vice versa.

When the mouth of the bag has been placed in position as shown in Fig. 1, operating fluid is admitted to the cylinder 18 through the pipe 24, moving the piston 19 and nozzle member 8 downwardly into contact with the mouth of the bag and clamping it against the backing member 4 as shown in Figs. 2 and 3 with the slot 12 covering the area 3. As the mouth of the bag is clamped between these members, the operating arm 15 engages the frame plate 6 and opens the valve 13 admitting steam to the nozzle member through the pipe 10. Steam thus fills the passage 12 in contact with the material of the bag along the area 3, but is substantially confined to this area since the bag is clamped tightly between the members. Where the ends of the passage 12 extend beyond the material of the bag as shown in Fig. 2, there may be some spacing between the ends of the nozzle member and the bag member, the amount of which will depend on the thickness of the bag material under compression by the piston 19 and on the yieldability of the backing member. However this spacing is very small and the steam leakage at the ends is accordingly very slight, the steam being confined under pressure in the nozzle passage so as to maintain a substantially uniform pressure at every point in the sealing area 3 and rapidly bring the packaging material to the desired sealing temperature due both to the latent heat and the sensible heat of the steam. As soon as the seal has been completed, the flow of operating fluid in the cylinder 18 is reversed withdrawing the piston 19 and nozzle member 8 and releasing the sealed bag. At the same time valve 13 is automatically closed, cutting off the supply of steam.

It will be seen that the invention insures the maintenance of uniform pressure and temperature at every point throughout the area of the seam. Regardless of irregularities of material or extra thickness due to folds, the packaging material will be pressed together at every point in the sealing zone with exactly the same pressure and will be heated rapidly at every point to the desired sealing temperature. Hence uniformly perfect seals are obtained without the difficulties heretofore attendant on the use of heated presser bars, rollers, etc., as described above. The desired sealing pressure and temperature can be readily obtained and accurately controlled merely by adjusting the heat content and pressure of the fluid medium. Another advantage of the invention, which is of particular importance in quantity production operations, is that very rapid sealing can be accomplished by the use of higher temperatures and pressures, and the seams can be removed immediately from sealing position without danger of imperfections. This feature of the invention enables quantity production of sealed packages at a high rate of speed, with consequent savings in time and expense.

It will be understood that the invention is not limited to the particular embodiments described above for purposes of illustration, and that various changes may be made in the details of the method without departing from the spirit of the invention. The choice of packaging and sealing materials, the particular fluid to be employed for sealing, the temperature and pressure to be employed, and other details will depend on conditions in each case which have been explained above and will readily be understood by those skilled in the art. Hence reference is to be had to the appended claims for a definition of the limits of the invention.

What is claimed is:

1. The method of forming a seal between adjacent flat sheets of packaging material having opposed surfaces of thermoplastic sealing material which comprises clamping said sheets together along the edges of the zone to be sealed, the clamped portions of the sheets in said zone forming a pressure chamber with one of said clamping members and then admitting a hot fluid under pressure to said chamber to heat and press said surfaces together while limiting the area of pressure application to said zone, whereby the seal is formed by fluid pressure without enclosing said packaging material in a pressure chamber.

2. The method of forming a seal between adjacent flat sheets of packaging material having opposed surfaces of thermoplastic sealing material which comprises clamping said sheets together along the edges of the zone to be sealed, the clamped portions of the sheets in said zone forming a pressure chamber with one of said clamping members and then admitting steam under pressure to said chamber to heat and press said surfaces together while limiting the area of pressure application to said zone, whereby the seal is formed by fluid pressure without enclosing said packaging material in a pressure chamber.

3. The method of forming a seal between adjacent flat sheets of packaging material having opposed surfaces of thermoplastic sealing material which comprises clamping said sheets together along the edges of the zone to be sealed between relatively movable clamping members, the clamped portions of the sheets in said zone forming a pressure chamber with one of said clamping members, heating and pressing said surfaces together by a hot fluid under pressure in said chamber while limiting the area of pressure application to said zone, and controlling the flow of said fluid in accordance with the relative movement of said members into and out of clamping position, whereby the seal is formed by fluid pressure without enclosing said packaging material in a pressure chamber.

4. The method of forming a seal between adjacent sheets of packaging material which comprises clamping portions of said sheets together along the edges of a zone to be sealed, said portions having opposed surfaces comprising thermoplastic sealing material, and confining a hot fluid under pressure in contact with one of said portions while limiting the area of pressure application to said zone to heat and press said surfaces together, whereby the seal is formed by fluid pressure without enclosing said packaging material in a pressure chamber.

5. The method of forming a seal between adjacent sheets of packaging material which comprises clamping portions of said sheets together along the edges of a zone to be sealed, said portions having opposed surfaces comprising thermoplastic sealing material, and confining steam under pressure in contact with one of said portions while limiting the area of pressure application to said zone to heat and press said surfaces together, whereby the seal is formed by fluid pressure without enclosing said packaging material in a pressure chamber.

6. The method of forming a seal between adjacent sheets of packaging material which comprises clamping portions of said sheets together along the edges of a zone to be sealed between relatively movable clamping members, said portions having opposed surfaces comprising thermoplastic sealing material, confining a hot fluid under pressure in contact with one of said portions while limiting the area of pressure application to said zone to heat and press said surfaces together, and controlling the flow of said fluid in accordance with the relative movement of said members into and out of clamping position, 7. A process of forming hermetic heat seals which comprises superimposing predetermined areas of flexible sheet material suitable for packaging, at least the meeting surfaces of which are thermoplastic; directing a current of warm gas against at least one exterior surface of said predetermined areas to bring said thermoplastic surfaces to their temperature of fusion; and supporting said predetermined areas against the kinetic energy of said gas to produce an effective sealing pressure between said thermoplastic surfaces.

8. A process of forming hermetic heat seals which comprises superimposing predetermined areas of flexible sheet material suitable for packaging, at least the meeting surfaces of which are thermoplastic; directing a current of warm gas against at least one exterior surface of said predetermined areas to bring said thermoplastic surfaces to their temperature of fusion; supporting said predetermined areas against the kinetic energy of said gas to produce an effective sealing pressure between said thermoplastic surfaces; and shielding predetermined portions of said areas from the heating and pressing effect of said current.

CHARLES A. SOUTHWICK, Jr.
ARTHUR F. STAGMEIER.